US009190932B2

(12) United States Patent
Harnefors et al.

(10) Patent No.: US 9,190,932 B2
(45) Date of Patent: Nov. 17, 2015

(54) METHOD AND DEVICE FOR CONTROLLING A MULTILEVEL CONVERTER

(75) Inventors: Lennart Harnefors, Eskilstuna (SE); Kalle Ilves, Västerås (SE)

(73) Assignee: ABB AB, Västerås (SE)

( * ) Notice: Subject to any disclaimer, the term of this patent is extended or adjusted under 35 U.S.C. 154(b) by 0 days.

(21) Appl. No.: 14/406,297

(22) PCT Filed: Aug. 7, 2012

(86) PCT No.: PCT/EP2012/065402
§ 371 (c)(1),
(2), (4) Date: Dec. 8, 2014

(87) PCT Pub. No.: WO2014/023334
PCT Pub. Date: Feb. 13, 2014

(65) Prior Publication Data
US 2015/0162848 A1  Jun. 11, 2015

(51) Int. Cl.
H02M 7/49 (2007.01)
H02M 7/483 (2007.01)
H02J 3/18 (2006.01)
H02M 7/217 (2006.01)
H02M 7/539 (2006.01)

(52) U.S. Cl.
CPC ............ *H02M 7/49* (2013.01); *H02J 3/1814* (2013.01); *H02M 7/217* (2013.01); *H02M 7/483* (2013.01); *H02M 7/539* (2013.01); *H02M 2007/4835* (2013.01); *Y02E 40/18* (2013.01)

(58) Field of Classification Search
CPC .......... H02M 7/49; H02M 2007/4835; H02M 7/483; H02M 7/539; H02M 7/217
See application file for complete search history.

(56) References Cited

U.S. PATENT DOCUMENTS 5,933,339 A * 8/1999 Duba et al. ............... 363/71
2002/0140294 A1  10/2002 Iwata et al.
(Continued)

FOREIGN PATENT DOCUMENTS

CN 101860203 A 10/2010
CN 102130619 A  7/2011
(Continued)

OTHER PUBLICATIONS

Hagiwara et al., "Control and Experiment of Pulsewidth-Modulated Modular Multilevel Converters", IEEE Transactions on Power Electronics, Jul. 2009, vol. 24, No. 7, pp. 1737-1746.
(Continued)

Primary Examiner — Fred E Finch, III
Assistant Examiner — Rafael O De Leon Domenech
(74) Attorney, Agent, or Firm — Birch, Stewart, Kolasch & Birch, LLP

(57) ABSTRACT

A method is provided for controlling a multilevel converter to balance voltages of submodule energy stores. This balancing involves calculating predicted final voltages of energy stores at the end of a time interval to follow and selecting which submodule of a phase arm to insert or bypass during the time interval based on a comparison of the predicted final voltages of the energy stores. The predicted final voltages are updated in accordance with any selection made of which submodule to insert or bypass during the time interval. A control device and a computer program product are also disclosed. Voltage balancing according to a pre-programmed modulation scheme is possible by means of the disclosed method.

20 Claims, 5 Drawing Sheets

(56) References Cited

U.S. PATENT DOCUMENTS

| | | | |
|---|---|---|---|
| 2010/0020577 A1 | 1/2010 | Dommaschk et al. | |
| 2012/0068555 A1 | 3/2012 | Aiello et al. | |
| 2014/0002048 A1* | 1/2014 | Pang et al. | 323/304 |

FOREIGN PATENT DOCUMENTS

| | | |
|---|---|---|
| CN | 102158112 A | 8/2011 |
| DE | 10 2009 043 599 A1 | 3/2011 |
| EP | 0 911 950 A2 | 4/1999 |
| JP | 2008-292272 A | 12/2008 |
| JP | 2010-124582 A | 6/2010 |
| JP | 2011-182517 A | 9/2011 |
| WO | WO 2010/145689 A1 | 12/2010 |
| WO | WO 2011/036005 A1 | 3/2011 |

OTHER PUBLICATIONS

Ilves et al, "A New Modulation Method for the Modular Multilevel Converter Allowing Fundamental Switching Frequency", IEEE Transactions of Power Electronics, Aug. 2012, vol. 27, No. 8, pp. 3482-3494.

Lesnicar et al., "An Innovative Modular Multilevel Converter Topology Suitable for a Wide PowerRange", Paper accepted for presentation at 2003 IEEE Bologna PowerTech Conference, Jun. 23-26, Bologna, Italy, 6 pages.

* cited by examiner

METHOD AND DEVICE FOR CONTROLLING A MULTILEVEL CONVERTER

TECHNICAL FIELD

The embodiments described herein generally relate to control of power electronic converters and in particular to control of a multilevel converter to balance voltages across energy stores of submodules of the multilevel converter.

BACKGROUND

The Modular Multilevel Converter (M2C) is a voltage source converter topology which may be used for AC/DC and DC/AC conversion in high-voltage high-power applications. Each phase leg of the typical Modular Multilevel converter has a number of series connected converter cells and two inductors. The converter cells, termed submodules, are generally controlled half bridges equipped with DC capacitors. Each chain of series connected submodules is referred to as one arm. The arm connecting the AC terminal to the positive DC terminal is referred to as the upper arm. Similarly, the arm connecting the AC terminal to the negative DC pole is referred to as the lower arm. The converter is controlled in such a way that the stored energy in the capacitors remains constant over time. This means that the capacitors act as voltage sources that can be either inserted or bypassed in the arms. The voltages at the AC and DC terminals can then be controlled by varying the number of inserted submodules in each arm.

In order to ensure that the stored energy in each submodule remains essentially constant over time, a capacitor voltage balancing strategy may be used. One possible solution is to use a conventional multilevel pulsewidth modulation (PWM) method, such as phase shifted carriers, and then control the energy levels by means of a feedback controller for each submodule. An example of this method is presented in the article "Control and Experiment of Pulsewidth-Modulated Modular Multilevel Converters" by Makoto Hagiwara and Hirofumi Akagi, published in IEEE Transactions on Power Electronics, vol. 24, No. 7, July 2009. The stored energy can also be kept constant over time by rotating the pulse pattern between the submodules as described in the article "A New Modulation Method for the Modular Multilevel Converter Allowing Fundamental Switching Frequency," by lives, K.; Antonopoulos, A.; Norrga, S.; Nee, H., published in IEEE Transactions on Power Electronics, vol. 27, No. 8, August 2012. Yet another possible solution is to use a sorting algorithm that selects which submodule to insert or bypass based on the sign of the current as described in the paper "An Innovative Modular Multilevel Converter Topoology Suitable for a Wide Power Range" by A. Lesnicar and R. Marquardt, published in 2003 IEEE Bologna PowerTech Conference Proceedings, Jun. 23-26, 2003, Bologna, Italy. That is, if one submodule is to be inserted and the current is positive, the submodule with the lowest voltage is inserted. If the current is negative, the submodule with the highest voltage is inserted. Similarly, if one submodule is to be bypassed, the submodule with the highest voltage is bypassed if the current is positive. If the current is negative, the submodule with the lowest voltage is bypassed.

However simulations of the capacitor voltage ripple in a modular multilevel converter using the above mentioned sorting algorithm have shown that although the capacitor voltages remains constant over time, the maximum deviation of the voltage ripple can be considerable compared to the case when the charge is distributed evenly between the submodules. Alternative methods for capacitor voltage balancing which allows for reduced voltage ripple would therefore be of interest.

SUMMARY

It is an object to provide methods and that allow for controlling a multilevel converter to balance voltages of submodule energy stores.

The above stated object is achieved by means of a method, a control device and a computer program product according to the independent claims.

A first embodiment provides a method for controlling a multilevel converter for converting an electric current. The multilevel converter comprises a control device for controlling the operations of the converter to achieve a requested operating condition. The multilevel converter further comprises a plurality of phase arms having a chain of series connected submodules. Each submodule comprises an energy store and each submodule is arranged to be controlled by the control device to be selectively inserted or bypassed in a phase arm. The method comprises a step of controlling, by means of the control device, insertion and bypassing of the submodules in accordance with a modulation scheme and the requested operating condition. This step of controlling comprises balancing voltages of the energy stores during a time interval. This balancing involves calculating predicted final voltages of the energy stores respectively at the end of a time interval to follow. The predicted final voltages are calculated based on an initial amount of charge stored in the respective energy stores and the amount of charge which, based on the requested operation condition and modulation scheme, is predicted to pass through the respective energy store during the time interval. The balancing of energy store voltages also involves selecting which submodule of a phase arm to insert or bypass during the time interval based on a comparison of the predicted final voltages of the energy stores. Furthermore the balancing of energy store voltages involves updating the predicted final voltages in accordance with any selection made of which submodule to insert or bypass during the time interval.

A second embodiment provides a control device for controlling a multilevel converter for converting an electric current. The control device comprises a processor and an interface for communicating control signals to submodules of the multilevel converter. The control device is configured to cause the method according to the above mentioned first embodiment to be carried out when the control device is operating to control the multilevel converter.

A third embodiment provides a computer program product stored on a computer readable storage medium and executable. The computer program product comprises software code portions for causing the method according to the above mentioned first embodiment to be carried out when executed by a processor of a control device for controlling a multilevel converter.

An advantage of some of the embodiments of this disclosure is that a reduction in voltage ripple of the energy stores as well as reduced switching frequency can be achieved compared to some voltage balancing strategies according to prior art. Reduced voltage ripple and switching frequency allows for reduced size and cost of submodule energy stores and lower switching losses of multilevel converters.

Another advantage of some of the embodiments of this disclosure is that voltage balancing according to a pre-programmed modulation scheme is possible.

Further advantages and features of embodiments of the present invention will become apparent when reading the following detailed description in conjunction with the drawings.

DETAILED DESCRIPTION

Figure 1:
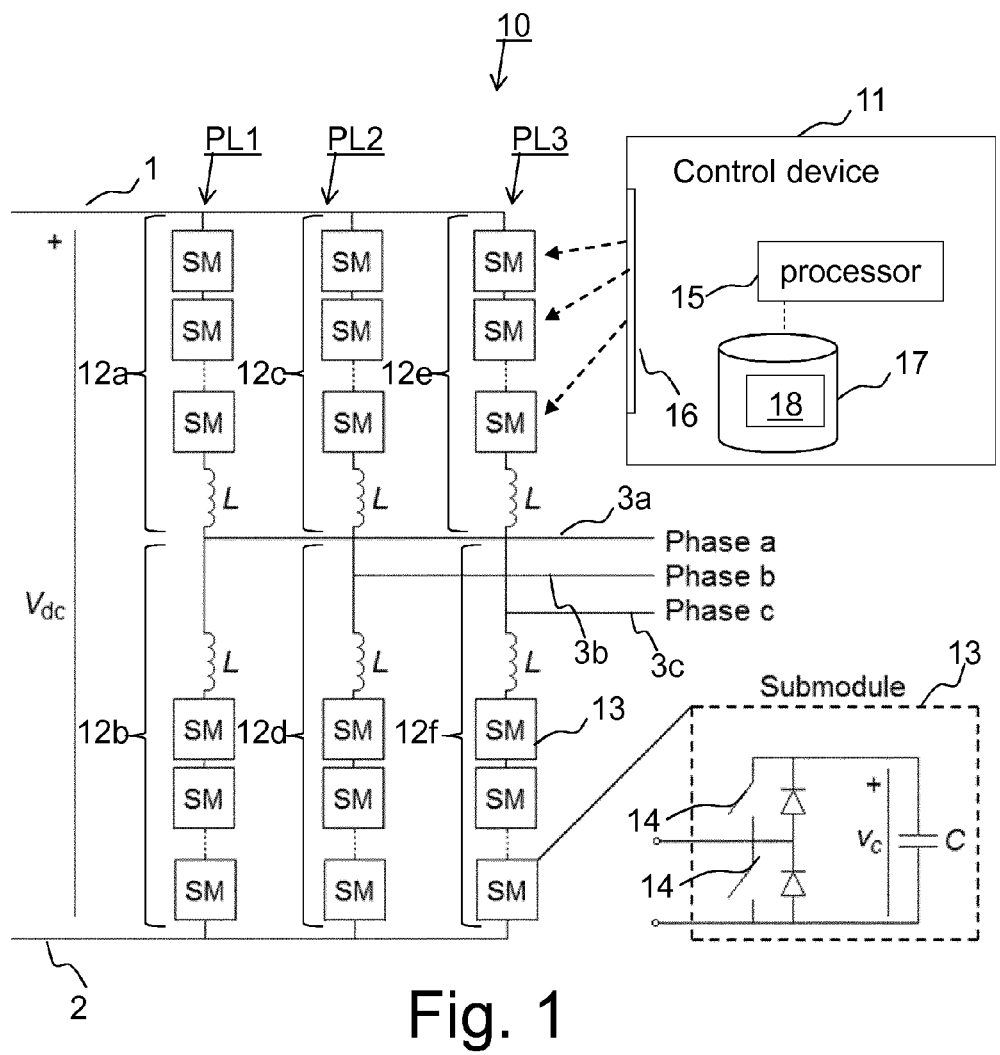
FIG. 1 is a schematic diagram illustrating a modular multilevel converter in which embodiments of this disclosure may be used.

The embodiments of this disclosure will now be described more fully hereinafter with reference to the accompanying drawings, in which different example embodiments are shown. These example embodiments are provided so that this disclosure will be thorough and complete and not for purposes of limitation. In the drawings, like reference signs refer to like elements.

FIG. 1 is a schematic block diagram illustrating a modular multilevel converter 10 in which example embodiments of this disclosure may be used. Only those parts of the converter 10 which are relevant for understanding different embodiments presented herein are illustrated in FIG. 1. The converter 10 may be provided as either a rectifier or an inverter in a power transmission system. The converter 10 here includes a group of branches in the form of phase legs connected in parallel between two DC terminals 1 and 2 for connection to a DC transmission system. In the example given here there are three such branches or phase legs PL1, PL2 and PL3 in order to enable connection to a three-phase AC transmission system. It should however be realized that as an alternative there may be for instance two phase legs or even one phase leg. Each phase leg PL1, PL2, PL3 has a first and second end point. In a converter of the type depicted in FIG. 1 the first end points of all the phase legs PL1, PL2 and PL3 are connected to a first DC terminal 1 while the second end points are connected to a second DC terminal 2.

Each phase leg PL1, PL2, PL3 of the converter 10 further includes phase arms 12a-f. Each phase leg PL1, PL2, PL3 includes an upper phase arm 12a, 12c, 12e and a lower phase arm 12b, 12d, 12f. At the junction where the upper and lower phase arms meet, there is provided an AC terminal 3a, 3b, 3c. Here each phase arm furthermore includes one inductor L connected to the corresponding AC terminal 3a, 3b, 3c.

The phase arms 12a-f all comprise submodules 13 that are used for forming the AC voltages. The submodules 13 are typically connected in series or in cascade in the phase arms.

In the present example there are three submodules 13 explicitly illustrated in each phase arm 12a-f. However the embodiments described herein are not limited to any particular number of submodules. It is often favourable to have many more submodules in each phase arm 12a-f, especially in High Voltage Direct Current (HVDC) applications. It can also be seen that the submodules of a phase leg are with advantage provided symmetrically around the AC terminal.

There is furthermore a control device 11 which is configured to control the submodules 13. Control of each submodule in a phase arm is normally done through providing the submodule with control signals that control the contribution of that submodule to an AC waveform provided by the converter 10. By controlling switches 14 of the submodules 13 different submodules may be either inserted or bypassed in the phase arms 12a-f. The switches 14 may e.g. be implemented by means of Insulated Gate Bipolar Transistors (IGBTs). Here the control device 11 controls the submodules 13 for converting AC power to DC power or vice versa. The submodules 13 further provide a voltage based on energy stored in energy stores C of the respective submodules. The energy stores C are typically implemented by means of DC capacitors, although it is possible to use batteries instead in some applications.

In the example converter 10, the submodules 13 in the upper phase arms 12a, 12c, 12e are typically controlled to provide a DC component corresponding to a positive DC voltage of the first DC terminal 1 and an AC component corresponding to the full AC voltage of a corresponding AC terminal 3a, 3b or 3c, while the submodules 13 of the corresponding lower phase arms 12b, 12d, 12f typically provide a DC component corresponding to a negative DC voltage of the second DC terminal 2 and an AC component corresponding to the full AC voltage of the corresponding AC terminal 3a, 3b or 3c. The instantaneous AC voltage values provided by the submodules 13 on opposite sides of an AC terminal of a phase leg here typically have opposite polarities.

The converter 10 may here be operated in two directions. If three-phase AC voltages are applied on the AC terminals 3a, 3b and 3c a DC voltage is generated, while if a DC voltage is applied between the DC terminals 1 and 2, a three-phase AC voltage is generated on terminals 3a, 3b and 3c. The control of the converter 10 furthermore typically involves generating control signals by the control unit 11 based on PWM.

Figure 2:
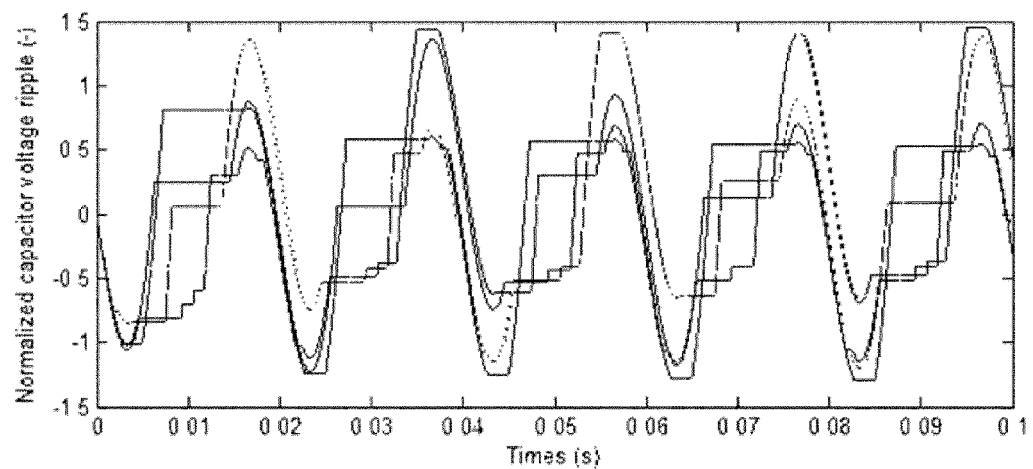
FIG. 2 is a diagram illustrating simulated capacitor voltage ripple of 5 different submodules of a phase arm of a modular multilevel converter in case a sorting algorithm according to prior art is used for capacitor voltage balancing.

As mentioned above, in order to ensure that the stored energy in each submodule remains essentially constant over time, a strategy for balancing voltages of submodule energy stores may be used, such as the sorting algorithm mentioned above in the background section. The capacitor voltage ripple in a modular multilevel converter with 5 submodules per phase arm and capacitors as energy stores was simulated using this previously mentioned sorting algorithm with a switching frequency that is 3 times higher than the fundamental frequency. The capacitor voltage ripple in the 5 submodules at transfer of mainly active power is shown in FIG. 2. In FIG. 2, the capacitor voltage ripple is normalized in such a way that the peak value is 1 unit if the charge is distributed evenly between the 5 submodules (that is, if an infinite switching frequency is used). It is observed that although the capacitor voltages remain constant over time, the maximum deviation is almost 1.5 times higher than the case when the charge is distributed evenly between the 5 submodules.

Embodiments of methods and devices will now be described which allow for implementation of a balancing strategy which is an alternative to the previously mentioned sorting algorithm. According to the alternative balancing strategy available information about the operating condition of the converter is utilized. Based on the available information, a prediction of the future shape and amplitude of the currents can be made for one fundamental frequency period. This is equivalent to predicting the amount of charge that will pass through the chain of series connected submodules in a following period. By using this information, the switching instants can be chosen in such a way that desired capacitor voltages are obtained.

The shape and amplitude of the current during the following fundamental frequency period can be predicted by using the available information about the operating conditions of the converter. That is, if the currents are defined as for inverter operation, the upper and lower arm currents, $i_u$, and $i_l$, can be expressed as $$i_l(t) = i_{DC} - \frac{1}{2} i_{AC}(t) + \sum i_{c,n}(t) \quad \text{(Eq. 1)}$$

$$i_u(t) = i_{DC} + \frac{1}{2} i_{AC}(t) + \sum i_{c,n}(t) \quad \text{(Eq. 2)}$$

where $i_{DC}$ is the direct current flowing between the DC terminals, $i_{AC}$, is the expected AC-side current for the following period and $i_{c,n}$ is the n th order harmonic in the current flowing between the DC terminals. The actual charge that will pass through each phase arm in any given time interval can then be predicted by calculating the integral of the expressions for the predicted arm currents, $i_u$, and $i_l$.

Figure 3:
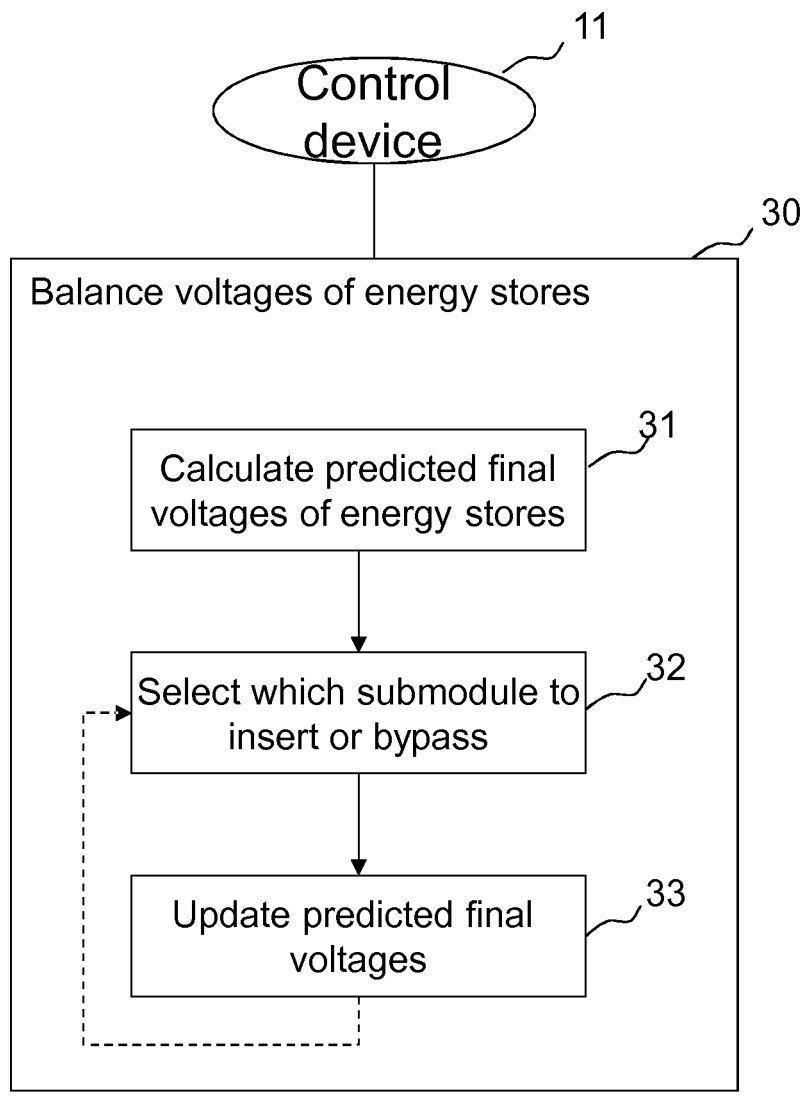
FIG. 3 is a flow diagram illustrating an embodiment of a method for controlling a multilevel converter to balance voltages of energy stores.

FIG. 3 is a flow diagram illustrating an embodiment of a method for controlling a multilevel converter. The method may e.g. be carried out in the control device 11 of the converter 10 illustrated in FIG. 1 to achieve balancing of the submodule energy stores C. According to the method insertion and bypassing of submodules 13 are controlled by means of the control device in accordance with a requested operating condition and a selected modulation scheme. The requested operating condition and the selected modulation scheme provide information about the requested transfer of active and reactive power, the modulation index and the modulation method itself such that it possible to predict the events that will take place during a fundamental frequency period. The modulation scheme provides information on the voltage levels that will take place during the fundamental frequency period and thereby on the number of submodules that are to be inserted or bypassed at different instances during the fundamental frequency period to achieve the voltage levels.

The method illustrated in FIG. 3 comprises a step 30 balancing voltages of the energy stores C during at least one time interval. A time interval may e.g. be a charging period during which the current is charging the energy stores C or a discharge period during which energy stores which are inserted in the phase arms are discharged. The step 30 comprises a step 31 of calculating predicted final voltages of each of the energy stores C at the end of a time interval to follow. This calculation is based on an initial amount of charge stored in the respective energy stores C and the amount of charge which, based on the requested operation condition and modulation scheme, is predicted to pass through the respective energy store C during the time interval. A step 32 involves selecting which submodule of a phase arm to insert or bypass during the time interval based on a comparison of said predicted final voltages of the energy stores. When any submodule has been selected to be inserted or bypassed in a phase arm a step 33 of updating the predicted final voltages in accordance with the selection made of which submodule (13) to insert or bypass is performed. By considering the predicted final voltages of the energy stores it is possible to make the selections of which submodule to insert or bypass such that the energy storage voltages converges towards a balanced situation towards the end of the time interval.

In order to clarify the alternative balancing strategy and the method illustrated in FIG. 3, an example of how it can be implemented in a multilevel converter using capacitors as energy stores is presented here. In this example, the aim of the balancing strategy will be to limit the peak voltage of the submodule capacitors. An alternative aim according to another example could be to instead limit the peak-to-peak value of the voltage.

Figure 4:
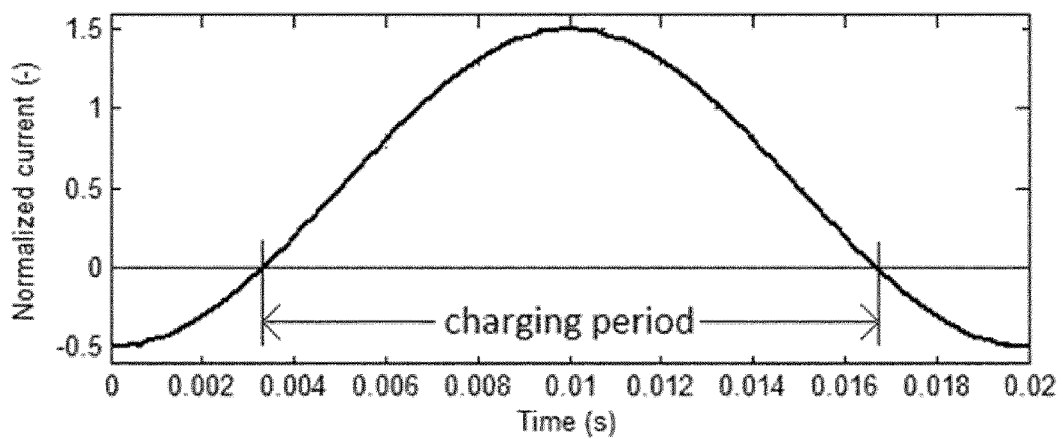
FIG. 4 is a diagram illustrating how a charging period is defined.

The peak voltage of the submodule capacitors will be limited by choosing the switching instants in such a way that the charge is evenly distributed among the different submodules when the voltages reach their maximum value. In order to do this, it is sufficient to apply the proposed strategy only when the current is charging the capacitors. This time period is referred to as the charging period and is defined as shown in FIG. 4.

In order to fully predict all of the requested voltage levels that will take place during the charging period, information about the modulation index and the modulation method itself are required. By knowing this information, all of the requested voltage levels that will take place during the charging period can be predicted. This means that by using the following method, it can be ensured that the charge will be evenly distributed among the submodule capacitors at the end of the charging period:

1. Calculate the charge associated with each voltage level: The different voltage levels that are to take place during a fundamental frequency period is each given an identity $v_1, v_2, \ldots v_m$ such that $v_{k+1}$ is always a higher voltage level than $v_k$. Since it is possible to predict the exact moments when the number of inserted and bypassed submodules of a phase arm changes, the amount of charge associated with each requested voltage level can be calculated. That is, the charge associated with the k th voltage level $v_k$ is given by the integral of the current over the time when the current is positive and the requested voltage level is $v_k$ or higher.

2. Calculate the common target voltage: A target voltage is a desired voltage across the submodule capacitors at the end of the charging period. To achieve perfect balance between the submodule capacitors at the end of the charging period, the target voltage should be set to the voltage which each energy store would have if the total charge of the energy stores is evenly distributed among the energy stores at the end of the time interval. This voltage is referred to herein as the balancing voltage. The balancing voltage can be calculated by adding the average charge associated with all requested voltage levels $v_k$ calculated in step 1 described above to the average value of the charge that is stored in the capacitors at the beginning of the charging period. By dividing this sum with the capacitance of the energy stores the balancing voltage is obtained. In this way, the target voltage becomes that voltage which is obtained if the charge is evenly distributed among all submodule capacitors at the end of the charging period.

3. Sort the cells by their capacitor voltage in a descending order: Each of the N submodules in one arm is given an identity, $1, 2, 3, \ldots, N$. The submodules are also sorted in such a way that submodule 1 has the highest voltage and submodule N has the lowest voltage.

4. Calculate the predicted final voltages: Now assume as, an initial assumption, that the converter is to be controlled in such a way that submodule k is inserted when voltage level $v_k$ or a voltage level which is higher than $v_k$ is requested. This means that if the submodules where switched in accordance with the initial assumption, at the end of the charging period, the stored charge in submodule k would be the sum of the initial charge and the charge associated with voltage level $v_k$ (calculated in step 1). The voltage in each submodule at the end of the charging period can then be calculated. This voltage is referred to as the predicted final voltage. The predicted final voltage is an individual property for each submodule. Since the submodules were sorted in a descending order, and the charge associated with voltage level $v_k$ is always higher than the charge associated with voltage level $v_{k+1}$, this means that the predicted final voltages based on the initial assumption will be sorted in a descending order as well.

5. Make an active choice of which submodule to insert or bypass: The number of submodules which are to be inserted and bypassed at any point in time of the charging period is given by the modulation scheme. When a submodule is to be inserted, a submodule where the predicted final voltage is lower than the target voltage is chosen. Accordingly no submodule where the predicted final voltage is higher than the target voltage will be selected for insertion. There are several ways in which this can be done, the most straightforward is to simply insert either the first or last submodule in the list of predicted final voltages that fulfill this criteria. When considering the beginning of the charging period, a selection of which submodule(s) to insert or bypass is made based on predicted final voltages derived from the initial assumption. The selection of which submodules to insert or bypass during different following time instances of the charging period can then be made based on updated predicted final voltages as will be explained further below. By stepwise increasing the time considered and, for each considered time instance, selecting which submodules to insert or bypass based on a comparison of the predicted final voltages of the submodules respectively, the capacitor voltages approaches the target voltage towards the end of the charging period.

6. Recalculate the predicted final voltages: The predicted final voltages are updated by integrating the current. If a submodule is selected in step 5 to be inserted or bypassed at any other point in time than what is given by the initial assumption, the predicted final voltage of the submodule will change compared to the predicted final voltage which was based on the initial assumption. In other words the predicted final voltages should be updated to take any deviations from the initial assumption into account. For each submodule k the predicted final voltages are thus updated as follows:

If submodule k is inserted and the actual voltage level is larger than or equal to $v_k$, the predicted final voltage does not change.

If submodule k is inserted and the actual voltage level is lower than $v_k$, the predicted final voltage is increasing as the integral of the current divided by the capacitance C.

If submodule k is bypassed and the actual voltage level is larger than or equal to $v_k$, the predicted voltage level is decreasing as the integral of the current divided by the capacitance C.

If submodule k is bypassed and the actual voltage level is lower than $v_k$, the predicted final voltage does not change.

7. Check if the target voltage is reached: As the predicted final voltages are updated, they will approach the target voltage. When the predicted final voltage of submodule k has reached the target voltage, submodule k is to be inserted if, and only if, the requested voltage level is equal to or higher than $v_k$. In other words, once the predicted final voltage of a submodule k has reached the target voltage, for the time instances of the charging period that remains to be considered, submodule k should only be inserted at those points in time during which submodule k should be inserted according to the initial assumption.

Figure 5:
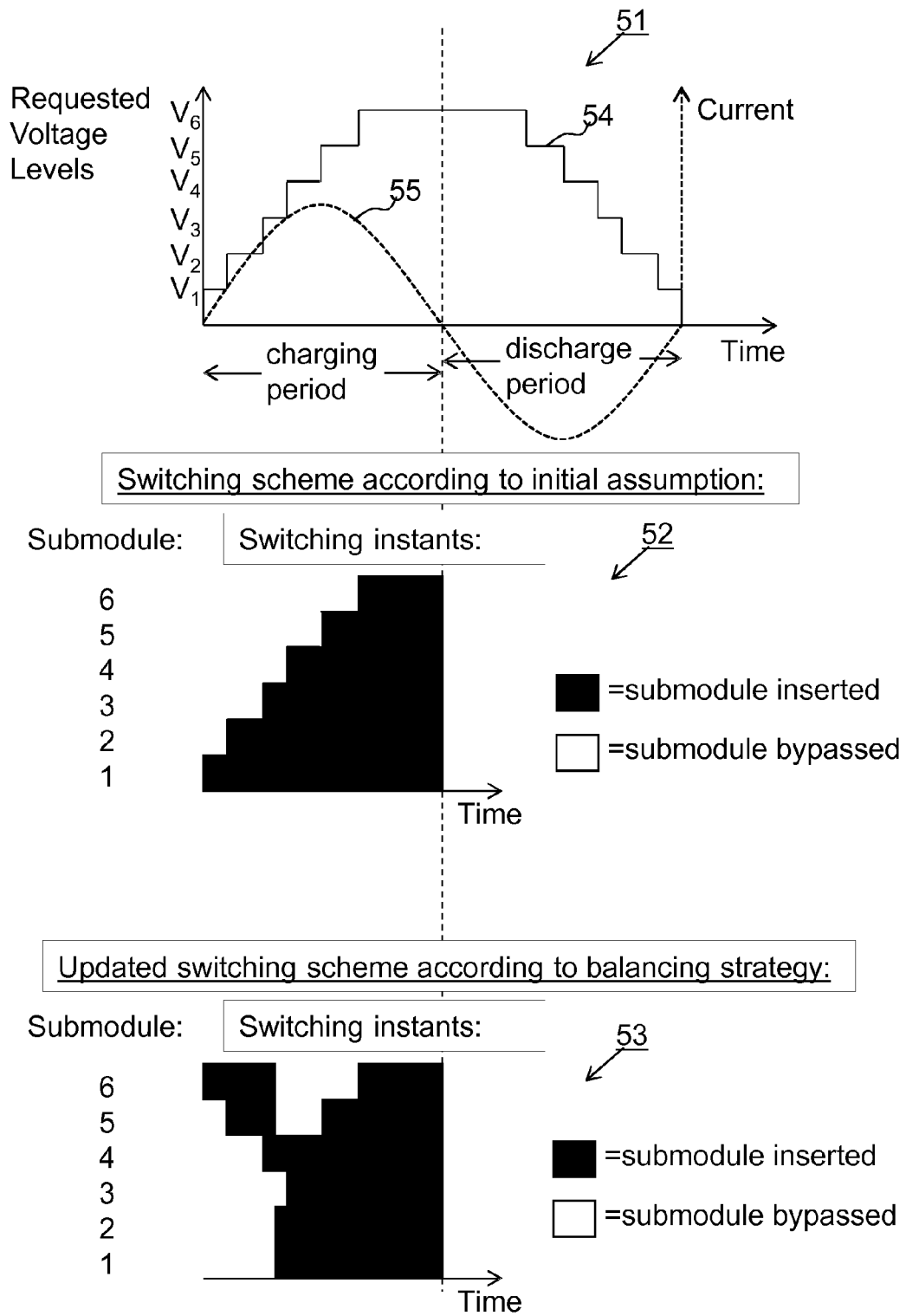
FIG. 5 is a schematic illustration of three diagrams which illustrate an example of an energy store voltage balancing scenario.

In order to provide a further understanding of the alternative balancing strategy, an example scenario related to the above described example implementation will now be described in connection with FIG. 5. FIG. 5 illustrates three related schematic diagrams 51, 52 and 53. In all three diagrams time is illustrated in the x-axis. The top diagram 51 provides a schematic illustration of requested voltage levels according to an example scenario of reactive power transfer. In the example 6 different voltage levels v1, v2, v3, v4, v5, v6 are illustrated by a solid line curve 54. The voltage level v1 corresponds to 1 inserted submodule while the voltage level v6 corresponds to 6 inserted submodules. Also in the top diagram 51, the current is illustrated by a dashed curve 55 and the charging period and the discharge period are indicated.

The middle diagram 52 provides a schematic illustration of a submodule switching scheme which corresponds to the initial assumption described above in step 4 of the example implementation. This diagram illustrates that according to the initial assumption submodule 1 is expected to be inserted for the longest period of time, while submodule 6 is expected to be connected for the shortest period of time. Further assume the predicted final voltages according to the initial assumption are such that the predicted final voltages for submodules 1, 2 and 3 are higher than the target voltage, while the predicted final voltages of the submodules 4, 5 and 6 are lower than the target voltage. Therefore when selecting which submodules to insert at different times during the charging period in order to balance the energy store voltages of the submodules at the end of the charging period, submodules 4, 5 and 6 would be selected to be inserted during longer portions of the charging period than they would be according to the initial assumption. Correspondingly submodules 1, 2 and 3 would be selected to be inserted during shorter portions of the charging period than they would be according to the initial assumption. The bottom diagram 53 illustrates schematically an example of a possible resulting scheme for inserting and bypassing submodules that may be obtained using the balancing strategy according to the example implementation described above.

As demonstrated by FIG. 5 the initial assumption serves as a preliminary scheme for when to insert or bypass different submodules which is used as a starting point for calculating predicted final voltages of the submodules. Adjustments to this preliminary scheme is then made in steps in accordance with the alternative voltage balancing strategy in order to arrive at a final scheme which hopefully achieves perfect voltage balance at the end of the time interval during which voltage balancing is to take place.

Figure 6:
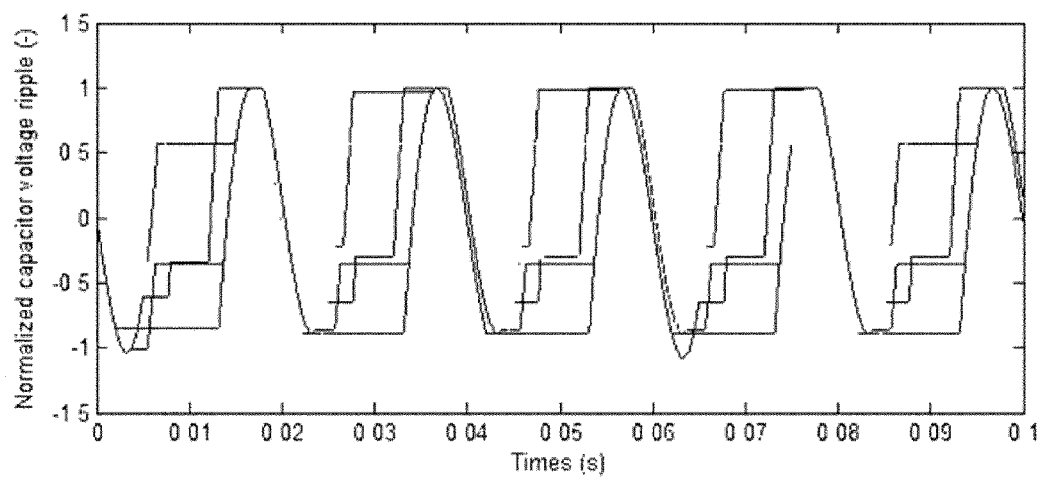
FIG. 6 is a diagram illustrating simulated capacitor voltage ripple of 5 different submodules of a phase arm of a modular multilevel converter in case a sorting algorithm according to a disclosed embodiment is used for capacitor voltage balancing.

The alternative voltage balancing strategy described above was simulated in a modular multilevel converter with 5 submodules per arm with the same loading conditions as for the simulation of the previously mentioned sorting algorithm shown in FIG. 2. However, the alternative voltage balancing strategy uses a lower switching frequency. In the simulation the resulting switching frequency is only 1.8 times higher than the fundamental frequency. That is, the switching frequency is reduced by 40% compared to the prior art solution in FIG. 2. The normalized capacitor voltage ripple that is obtained using the alternative balancing strategy is presented in FIG. 6. It is observed that the peak voltage is, indeed, 1 unit. This means that compared to the prior art solution, the proposed sorting algorithm offers a significant reduction in the capacitor voltage ripple at a lower switching frequency. This will reduce both the cost and size of the capacitors and also lower the switching losses in the converter.

The above described alternative voltage balancing strategy can be implemented in many different ways. A key component of the strategy is to maintain information about the remaining charge in the charging period that needs to be distributed among the submodules. This is achieved by calculating predicted final voltages of the respective submodules and updating the predicted final voltages when selections of which submodule(s) to insert and bypass are made.

The actual sorting procedure, initial assumption, calculation of predicted final voltages, and choice of which submodule that should be inserted can be varied in many different ways. These variations will not change the peak voltage but may have an impact on the resulting switching frequency. In addition to the above mentioned variations, there are a few additional variations that can be used when implementing the alternative voltage balancing strategy. Some of these variations are discussed below.

The example implementation and example scenario described above concerned voltage balancing during the charging period. However a corresponding voltage balancing strategy may also be used for the discharge period. The selection of which submodule to insert and bypass when the time interval for voltage balancing is a discharge period, is made such that a submodule associated with a predicted final voltage which is higher than the target voltage balancing voltage is selected for insertion when a submodule is to be inserted to achieve the requested voltage level according to the modulation scheme. Correspondingly, when a submodule is to be bypassed during a discharge period a submodule associated with a predicted final voltage which is lower than the balancing voltage is selected. The selections of which submodule to insert or bypass could be made in several different ways as long as these criteria are fulfilled. For instance, when selecting a submodule for insertion during the discharge period, the submodule associated with the highest predicted final voltage or alternatively the submodule associated with the lowest predicted final voltage which is higher than the balancing voltage may be selected.

In the above example implementation it was described that the target voltage of the submodules was calculated. However, according to some embodiments the target voltage is not expressly calculated. If selections of which submodule to insert or bypass are continuously made with an aim to reduce the variation of predicted final voltages among the different submodules an improved voltage balance between the submodules may still be obtained at the end of the charging period without being aware of the optimal balance that could be achieved at the end of the time interval during which voltage balancing is to be performed. It is however generally considered beneficial to calculate some kind of target reference value to facilitate appropriate submodule selections. The target reference value provides an indication of the balancing voltage. Instead of using the actual balancing voltage as the target reference value, the target reference value could e.g. be some other type of quantity from which the balancing voltage could be derived, such as the charge that each energy store would have if the charge is evenly distributed among all of the submodule energy stores.

The above described example embodiments aim to balance the capacitor voltages in such a way that the peak voltage is exactly the same in all submodules. However, if a small deviation between the energy store voltages is allowed, the resulting switching frequency can be reduced. This can be done by adding a tolerance band for the balancing voltage $v_T$. That is, when the predicted final voltage associated with a submodule lies between $v_T-\delta$ and $vT+\delta$, the submodule is considered to have reached a balancing target. An advantage with this approach is that very narrow pulses with a negligible impact on the actual energy storage voltage ripple can be removed.

If updating of predicted final voltages can be made in real time, the alternative voltage balancing strategy may be implemented to run online, i.e. in real time while the multilevel converter is in use. An alternative approach is to perform the step of balancing voltages of the energy stores such that the requested operating condition is simulated offline to derive a pre-programmed scheme for which submodule to insert or bypass at different times during operation of the multilevel converter in accordance with the requested operating condition and then execute the pre-programmed scheme when the multilevel converter is operated in accordance with said requested operation condition.

When using a balancing strategy in line with what has been described above there is no guarantee that the loading conditions for all submodules will be the same. That is, the switching losses and conduction losses may be different in one submodule compared to another. Therefore, it may be advantageous to utilize a programmed modulation method such that, over time, the switching and conduction losses are the same in all submodules. This can be done by simulating any given operating point with the above described alternative voltage balancing strategy. The resulting pulse pattern can then be used to find a predefined pulse pattern that gives the desired energy store voltages.

According to some embodiments the alternative voltage balancing strategy comprises sorting submodules in a list ordered according to the size of the predicted final voltage associated with the submodules respectively. The step of selecting which submodule to insert or bypass may then be made based on the order of the submodule in the list. However, according to an alternative embodiment the submodules are not sorted according to their associated predicted final voltages and the selection of which submodule to insert or bypass is made randomly among the submodules associated with predicted final voltages which fulfil the applicable criteria for insertion or bypass as explained above.

It may be of interest to also try to balance the switching frequency experienced by each individual submodule. Therefore, the selection of which submodule to insert or bypass during the applicable time interval may further be based on information on switching frequency of the respective individual submodules in order to balance the switching frequency of the respective individual submodules long term over a plurality of time intervals.

The control device 11 illustrated in FIG. 1 may be configured to cause the method according to any of the above described example embodiments to be carried out when the control device is operating to control the multilevel converter 10. As shown in FIG. 1, the control device includes a processor 15, an interface 16, and a memory 17 storing a computer program product 18. The interface allows the control device to communicate control signals to the submodules 13. The computer program product 18 comprises software code portions for causing the alternative voltage balancing strategy to be carried out when the software code portions are executed by the processor 15. The computer program product 18 may e.g. be stored on different types of portable memory means and loaded into the memory 17. In some embodiments the control device 11 may be a functional unit which is distributed over several physical locations. The control device may e.g. comprise a centralized part which is responsible for performing some central calculations related to converter control and a local part responsible for other control functions which make use of the central calculations.

In the drawings and specification, there have been disclosed typical embodiments and, although specific terms are employed, they are used in a generic and descriptive sense only and not for purposes of limitation, the scope of the invention being set forth in the following claims.

The invention claimed is:

1. A method for controlling a multilevel converter for converting an electric current, said multilevel converter comprising a control device for controlling the operations of the converter to achieve a requested operating condition and a plurality of phase arms having a chain of series connected submodules, wherein each submodule comprises an energy store and wherein each submodule is arranged to be controlled by said control device to be selectively inserted or bypassed in a phase arm, the method comprising the steps of:

controlling, by said control device, insertion and bypassing of said submodules in accordance with a modulation scheme and said requested operating condition, wherein said step of controlling comprises balancing voltages of said submodules during at least one time interval by:

calculating predicted final voltages of said submodules respectively at the end of a time interval to follow based on an initial amount of charge stored in the respective energy stores and the amount of charge which, based on the requested operation condition and modulation scheme, is predicted to pass through the respective energy store during said time interval;

selecting which submodule of a phase arm to insert or bypass during said time interval based on a comparison of said predicted final voltages of the respective submodules; and updating said predicted final voltages in accordance with any selection made of which submodule to insert or bypass during said time interval.

2. The method according to claim 1, wherein said step of balancing voltages of said submodules further comprises calculating a target reference value of said energy stores using information on the requested operating condition during said time interval, wherein said target reference value is indicative of a balancing voltage, which balancing voltage is a voltage across said energy stores which each submodule would have if the total charge of said submodules is evenly distributed between the submodules at the end of said time interval.

3. The method according to claim 2, wherein said target reference value is a function of a sum of the average charge that is stored in said submodules at the beginning of said time interval and the average charge associated with voltage levels which are to take place during said time interval in accordance with the requested operating condition.

4. The method according to claim 2, wherein, when said time interval is a charging period to follow during which the current is charging said energy stores, said step of selecting which submodule to insert or bypass involves selecting a submodule associated with a predicted final voltage which is lower than said balancing voltage when a submodule is to be inserted according to said modulation scheme.

5. The method according to claim 2, wherein, when said time interval is a charging period to follow during which the current is charging said energy stores, said step of selecting which submodule to insert or bypass involves selecting a submodule associated with a predicted final voltage which is higher than said balancing voltage when a submodule is to be bypassed according to said modulation scheme.

6. The method according to claim 2, wherein, when said time interval is a discharge period to follow during which said energy stores are discharged, said step of selecting which submodule to insert or bypass involves selecting a submodule associated with a predicted final voltage which is higher than said balancing voltage when a submodule is to be inserted according to said modulation scheme.

7. The method according to claim 2, wherein, when said time interval is a discharge period to follow during which said energy stores are discharged, said step of selecting which submodule to insert or bypass involves selecting a submodule associated with a predicted final voltage which is lower than said balancing voltage when a submodule is to be bypassed according to said modulation scheme.

8. The method according to claim 1, wherein a submodule is considered to reach a balancing target when the associated predicted final voltage is within a predetermined tolerance band around said balancing voltage.

9. The method according to claim 1, wherein said step of selecting which submodule to insert or bypass during said time interval is further based on information on switching frequency of the respective individual submodules to balance the switching frequency of the respective individual submodules long term over a plurality of time intervals.

10. The method according to claim 1, wherein said step of balancing voltages of said submodules further comprises sorting said submodules in a list ordered according to the size of the predicted final voltage associated with the energy store of the submodules respectively.

11. The method according to claim 10, wherein said step of selecting which submodule to insert or bypass during said time interval involves selecting a submodule based on the order of the submodule in said list.

12. The method according to claim 1, wherein said step of balancing voltages of said submodules during at least one time interval comprises simulating the requested operating condition offline to derive a pre-programmed scheme for which submodule to insert or bypass at different times during operation of the multilevel converter in accordance with the requested operating condition and executing said pre-programmed scheme when the multilevel converter is operated in accordance with said requested operation condition.

13. The method according to claim 1, wherein said energy stores are direct current capacitors.

14. A control device for controlling a multilevel converter for converting an electric current, wherein the control device comprises a processor and at least one interface for communicating control signals to submodules of the multilevel converter and wherein the control device is configured to cause the method according to claim 1 to be carried out when the control device is operating to control the multilevel converter.

15. A computer program product stored on a non-transitory computer readable storage medium and executable, the computer program product comprising software code portions for causing the method according to claim 1 to be carried out when executed by a processor of a control device for controlling a multilevel converter.

16. The method according to claim 3, wherein, when said time interval is a charging period to follow during which the current is charging said energy stores, said step of selecting which submodule to insert or bypass involves selecting a submodule associated with a predicted final voltage which is lower than said balancing voltage when a submodule is to be inserted according to said modulation scheme.

17. The method according to claim 3, wherein, when said time interval is a charging period to follow during which the current is charging said energy stores, said step of selecting which submodule to insert or bypass involves selecting a submodule associated with a predicted final voltage which is higher than said balancing voltage when a submodule is to be bypassed according to said modulation scheme.

18. The method according to claim 4, wherein, when said time interval is a charging period to follow during which the current is charging said energy stores, said step of selecting which submodule to insert or bypass involves selecting a submodule associated with a predicted final voltage which is higher than said balancing voltage when a submodule is to be bypassed according to said modulation scheme.

19. The method according to claim 3, wherein, when said time interval is a discharge period to follow during which said energy stores are discharged, said step of selecting which submodule to insert or bypass involves selecting a submodule associated with a predicted final voltage which is higher than said balancing voltage when a submodule is to be inserted according to said modulation scheme.

20. The method according to claim 4, wherein, when said time interval is a discharge period to follow during which said energy stores are discharged, said step of selecting which submodule to insert or bypass involves selecting a submodule associated with a predicted final voltage which is higher than said balancing voltage when a submodule is to be inserted according to said modulation scheme.

\* \* \* \* \*